United States Patent [19]
Alimpich et al.

[11] Patent Number: 5,781,193
[45] Date of Patent: Jul. 14, 1998

[54] GRAPHICAL INTERFACE METHOD, APPARATUS AND APPLICATION FOR CREATING MULTIPLE VALUE LIST FROM SUPERSET LIST

[75] Inventors: Claudia C. Alimpich; Joan Stagaman Goddard, both of Boulder, Colo.; Minh Trong Vo, Mountain View, Calif.; James Philip Wittig, Boulder; Rachel Youngran Yang, Superior, both of Colo.

[73] Assignee: International Business Machines Corporation, Armonk, N.Y.

[21] Appl. No.: 696,761

[22] Filed: Aug. 14, 1996

[51] Int. Cl.⁶ .................................................. G06F 3/14
[52] U.S. Cl. .......................... 345/352; 345/346; 345/347
[58] Field of Search .................................. 395/352, 353, 395/341, 973, 347, 975, 346; 345/146, 902, 352, 353, 347, 975, 346, 341, 973

[56] References Cited

U.S. PATENT DOCUMENTS

| | | | |
|---|---|---|---|
| 4,464,652 | 8/1984 | Lapson et al. | 345/146 X |
| 4,862,390 | 8/1989 | Weiner | 345/352 |
| 5,001,654 | 3/1991 | Winiger et al. | 707/529 |
| 5,062,060 | 10/1991 | Kolnick | 345/339 |
| 5,072,412 | 12/1991 | Henderson | 345/346 |
| 5,095,512 | 3/1992 | Roberts et al. | 382/245 |
| 5,117,372 | 5/1992 | Petty | 345/335 |
| 5,119,476 | 6/1992 | Texier | 345/347 |
| 5,121,477 | 6/1992 | Koopmans et al. | 345/333 |
| 5,140,677 | 8/1992 | Fleming et al. | 345/348 |
| 5,140,678 | 8/1992 | Torres | 345/350 |
| 5,164,911 | 11/1992 | Juran et al. | 345/418 X |
| 5,206,950 | 4/1993 | Geary et al. | 395/702 |
| 5,208,907 | 5/1993 | Shelton et al. | 345/344 X |
| 5,208,910 | 5/1993 | Higgins et al. | 345/352 |
| 5,228,123 | 7/1993 | Heckel | 345/334 |
| 5,233,687 | 8/1993 | Henderson et al. | 345/346 |
| 5,247,651 | 9/1993 | Clarisse et al. | 395/500 |

(List continued on next page.)

FOREIGN PATENT DOCUMENTS

| | | |
|---|---|---|
| 2097540 | 12/1994 | Canada . |
| 0 587 394 A1 | 3/1994 | European Pat. Off. . |
| 0 622 728 A1 | 11/1994 | European Pat. Off. . |
| 4-361373 | 12/1992 | Japan . |
| 5-313845 | 11/1993 | Japan . |
| 6-4117 | 1/1994 | Japan . |
| 6-215095 | 8/1994 | Japan . |
| 7-129597 | 5/1995 | Japan . |

OTHER PUBLICATIONS

"Device Independent Graphics Using Dynamic Generic Operator Selection," *IBM Technical Disclosure Bulletin*, Apr. 1983, vol. 25, No. 11A, pp. 5477–5480.

"Error–Tolerant Dynamic Allocation of Command Processing Work Space," *IBM Technical Disclosure Bulletin*, Jun. 1984, vol. 27, No. 1B, pp. 584–586.

"Means for Computing the Max of a Set of Variables Distributed Across Many Processors," *IBM Technical Disclosure Bulletin*, Sep. 1990, vol. 33, No. 4, pp. 8–12.

"Graphical User Interface for the Distributed System Namespace," *IBM Technical Disclosure Bulletin*, Jul. 1992, vol. 35, No. 2, pp. 335–336.

"Graphical Query System," *IBM Technical Disclosure Bulletin*, Nov. 1993, vol. 36, No. 11, pp. 615–616.

"A Multicolumn List–Box Container for OS/2," *Dr. Dobb's Journal*, May 1994, vol. 19, No. 5, pp. 90–94.

(List continued on next page.)

*Primary Examiner*—Raymond J. Bayerl
*Attorney, Agent, or Firm*—Jenkens & Gilchrist

[57] ABSTRACT

A subset list is created from a superset list in a graphical user interface. The subset list is presented in a vertical format with each item on the list on a separate line. Vertical and horizontal scrollbars make the list easy to use. The subset list items selected on the superset list continue to show as selected and appear each time the superset list window is opened. Thus, only additions or deletions from the subset list must be addressed. Those entries on the subset list that are to remain the same do not have to be re-selected on the superset list.

14 Claims, 7 Drawing Sheets

U.S. PATENT DOCUMENTS

| | | | |
|---|---|---|---|
| 5,249,265 | 9/1993 | Liang | 345/356 |
| 5,255,359 | 10/1993 | Ebbers et al. | 345/433 |
| 5,276,901 | 1/1994 | Howell et al. | 707/9 |
| 5,287,447 | 2/1994 | Miller et al. | 345/342 |
| 5,307,451 | 4/1994 | Clark | 345/427 |
| 5,315,703 | 5/1994 | Matheny et al. | 345/507 |
| 5,317,687 | 5/1994 | Torres | 345/146 X |
| 5,317,730 | 5/1994 | Moore et al. | 707/100 |
| 5,367,619 | 11/1994 | Dipaolo et al. | 345/352 X |
| 5,371,844 | 12/1994 | Andrew et al. | 345/334 |
| 5,377,317 | 12/1994 | Bates et al. | 345/342 |
| 5,388,255 | 2/1995 | Pytlik et al. | 707/4 |
| 5,394,521 | 2/1995 | Henderson et al. | 345/346 |
| 5,404,439 | 4/1995 | Moran et al. | 345/326 |
| 5,410,695 | 4/1995 | Frey et al. | 395/680 |
| 5,410,704 | 4/1995 | Norden-Paul et al. | 345/440 X |
| 5,412,776 | 5/1995 | Bloomfield et al. | 345/346 |
| 5,414,806 | 5/1995 | Richards | 345/435 |
| 5,416,900 | 5/1995 | Blanchard et al. | 345/346 |
| 5,418,950 | 5/1995 | Li et al. | 345/346 X |
| 5,425,140 | 6/1995 | Bloomfield et al. | 345/353 |
| 5,428,554 | 6/1995 | Laskoski | 345/967 X |
| 5,428,776 | 6/1995 | Rothfield | 345/348 X |
| 5,438,659 | 8/1995 | Notess et al. | 345/335 |
| 5,450,545 | 9/1995 | Martin et al. | 395/701 |
| 5,454,071 | 9/1995 | Siverbrook et al. | 345/441 |
| 5,454,106 | 9/1995 | Burns et al. | 707/4 |
| 5,459,825 | 10/1995 | Anderson et al. | 345/433 |
| 5,459,832 | 10/1995 | Wolf et al. | 345/342 |
| 5,463,724 | 10/1995 | Anderson et al. | 707/503 |
| 5,473,745 | 12/1995 | Berry et al. | 345/340 |
| 5,479,599 | 12/1995 | Rockwell et al. | 345/349 |
| 5,481,666 | 1/1996 | Nguyen et al. | 345/357 |
| 5,483,651 | 1/1996 | Adams et al. | 707/1 |
| 5,485,175 | 1/1996 | Suzuki | 345/353 |
| 5,487,141 | 1/1996 | Cain et al. | 345/435 |
| 5,491,795 | 2/1996 | Beaudet et al. | 345/346 |
| 5,497,454 | 3/1996 | Bates et al. | 345/344 |
| 5,497,484 | 3/1996 | Potter et al. | 345/348 X |
| 5,515,497 | 5/1996 | Itri et al. | 345/352 X |

OTHER PUBLICATIONS

"Configuration Data Set Build Batch Program," *IBM Technical Disclosure Bulletin*, Nov. 1993, vol. 36, No. 11, p. 571.

Self–Contained Reusable Programmed Components, *IBM Technical Disclosure Bulletin*, Jul. 1995, vol. 38, No. 7, pp. 283–285.

"IBM Printing Systems Manager for AIX Overview," *International Business Machines Corporation*, Second Edition, Feb. 1996.

"IBM Printing Systems Manager for AIX Administrating," *International Business Machines Corporation*, 1995.

"Matching Three–Dimensional Objects Usinng a Relational Paradigm," *Pattern Recognition*, vol. 17, No. 4, pp. 385–405, 1984.

GRAPHICAL INTERFACE METHOD, APPARATUS AND APPLICATION FOR CREATING MULTIPLE VALUE LIST FROM SUPERSET LIST

BACKGROUND OF THE INVENTION AND STATE OF THE PRIOR ART

1. Field of the Invention

The present invention relates to graphical user interfaces. More particularly, the present invention relates to a method, apparatus and application for creating a multiple value subset list from a superset list.

2. Description of Related Art

In order to better understand the terms utilized in this patent application, a brief background definition section will be presented so that the reader will have a common understanding of the terms employed and associated with the present invention.

A "user interface" is a group of techniques and mechanisms that a person employs to interact with an object. The user interface is developed to fit the needs or requirements of the users who use the object. Commonly known user interfaces can include telephone push buttons or dials, or pushbuttons such as on a VCR or a television set remote. With a computer, many interfaces not only to allow the user to communicate with the computer but also allow the computer to communicate with the user. These would include (1) command-line user interfaces (i.e., user remembered commands which he/she enters, e.g. "C:>DIR" in which "DIR" is a typical DOS command entered at the "C" prompt); (2) menu-driven user interfaces which present an organized set of choices for the user, and (3) graphical user interfaces, ("GUI") in which the user points to and interacts with elements of the interface that are visible, for example by a "mouse" controlled arrow or cursor.

An example of a GUI user interface is that which is offered by International Business Machines Corporation (IBM) under the name "Common User Access" ("CUA"). This GUI incorporates elements of object orientation (i.e., the user's focus is on objects and the concept of applications is hidden). Object orientation of the interfaces allow for an interconnection of the working environment in which each element, called an "object," can interact with every other object. The objects users require to perform their tasks and the objects used by the operating environment can work cooperatively in one seamless interface. With object oriented programming using a GUI, the boundaries that distinguish applications from operating systems are no longer apparent or relevant to the user.

In connection with this patent application, an "object" means any visual component of a user interface that a user can work with as a unit, independent of other items, to perform a task. By way of example, a spreadsheet, one cell in a spreadsheet, a bar chart, one bar in a bar chart, a report, a paragraph in a report, a database, one record in a database, and a printer are all objects. Each object can be represented by one or more graphic images, called "icons," with which a user interacts, much as a user interacts with objects in the real world. (NOTE: In the real world, an object might be an item that a person requires to perform work. As an example, an architect's objects might include a scale, T-square, and a sharp pencil, while an accountant's objects might include a ledger and a calculator.) However, it is not required that an object always be represented by an icon, and not all interaction is accomplished by way of icons. For example, and as will be seen hereinafter, a user can interact with an object by opening a window that displays more information about the object and includes a variety of mechanisms for interacting with the object.

While classification of objects may follow many different definitions, each class of objects has a primary purpose that separates it from the other classes. A class may be looked at as a group of objects that have similar behavior and information structures. In addition, each of the objects enumerated and defined below may contain other objects. There are three primary classes of objects. Each is discussed below.

(1) Container Object: This object holds other objects. Its principal purpose is to provide the user with a way to hold or group related objects for easy access or retrieval. An operating system, e.g. OS/2® (a trademark of IBM Corporation) or Windows® (a trademark of Microsoft Corporation), typically provides a general-purpose container, for example a folder or a program group—that holds any type of object, including other containers. For example, imagine a program group (or folder) labeled "PRIVATE FOLDER—ICONS". In the program group are three folder icons labeled "REPORTS", "PORTFOLIO" and "LETTERS". By selecting with a mouse or other pointing device the icon "PORTFOLIO", another window may open showing three more icons labeled "OIL PAINTINGS", "WATERCOLORS", "PORTRAITS". In turn, selecting any of those three icons may open additional windows with further icons representing further subdivisions, or cross-references (e.g., "CUSTOMERS").

(2) Data Objects: The principal purpose of a data object is to convey information. This information may be textual or graphical information or even audio or video information. For example, a business report displayed on the computer monitor may contain textual information concerning sales of "gadgets" over the past few years (text object) to all customers and also may contain a bar chart (graphic object) to pictorially depict, on the same monitor screen, the sales information.

(3) Device Objects: The principal purpose of a device object is to provide a communication vehicle between the computer and another physical or logical object. Many times the device object represents a physical object in the real world. For example, a mouse object or icon can represent the user's pointing device, and a modem object can represent the user's modem, or a printer object or icon can represent the user's printer. Other device objects are purely logical, e.g. an out-basket icon representing outgoing electronic mail; a wastebasket object or icon representing a way the user may "trash" or dispose of other objects.

As can be seen from the foregoing, a class of objects may be defined as a description of the common characteristics of several objects, or a template or model which represents how the objects contained in the class are structured. While there are further ways in which to define objects and class of objects, typically each class of objects will include similar attributes, the values of which the user will alter, modify, replace or remove from time to time. For a more complete discussion of objects, attributes, object oriented interfaces see "Object Oriented Interface Design: IBM Common User Access" (published by Que, ISBN 1-56529-170-0).

In a graphical user interface there is frequently a need to construct a shorter "subset" list from a longer "superset" list of multiple terms or symbols. This need is met in the prior art by a mechanism that is not entirely satisfactory. In the prior art, the subset list is presented in an entry field, with each item in the subset list separated by a comma. This is the procedure followed, for example, in AIX's Visual Systems Management GUIs. In accordance with the prior art, the superset list is accessed by selecting a "List" pushbutton. A separate dialog box then opens listing all of the items which may be selected from the superset list to form the subset list.

The prior art solution to the problem has two significant drawbacks. First, for subset lists with many items, the horizontal list with each entry separated by commas, is difficult to use since, typically, less then three items can be seen by the user at any one time. Secondly, items selected in the superset list to form the subset list do not remain selected in the superset list when the superset list is closed and then later re-opened. Thus, the user must re-select on the superset list even the unchanged items on the subset list each time a change is needed to the subset list that requires opening the superset list.

SUMMARY OF THE INVENTION

In view of the above, it is a principal object of the present invention to provide a graphically oriented method, application and apparatus to facilitate selection and generation of a subset list from a superset list.

Another object of the present invention is to provide for creation of a subset list that is easy for the user to see and use.

Yet another object of the present invention is to provide a means for retaining in the superset list which entries of the superset list have been previously selected to form the subset list, so that the user does not have to re-select the unchanged entries on the subset list each time the superset list window is closed and then re-opened.

Still another object of the present invention is to provide an application which may be employed in a number of different computers, may be transported between different computers, and may be loaded into various computer environments.

The invention is carried out in the following environment. The computer system has at least a visual operator interface, an operating system for operating applications within the computer system, and memory for storing at least part, preferably all, of an application.

The present invention is of a method, apparatus, and application that creates a subset list. The subset list is presented in a vertical format with each item on the list on a separate line. Vertical and horizontal scrollbars make the list easy to use. The subset list items selected on the superset list continue to show as selected on the superset list and appear each time the superset list window is opened. Thus, only additions or deletions from the subset list must be addressed. Those entries on the subset list that are to remain the same do not have to be re-selected on the superset list.

Other objects of the invention and a more complete understanding of the invention may be had by referring to the following description taken in conjunction with the accompanying drawings.

BRIEF DESCRIPTION OF THE DRAWING(S)

DESCRIPTION OF THE ILLUSTRATIVE EMBODIMENT(S)

Figure 1:
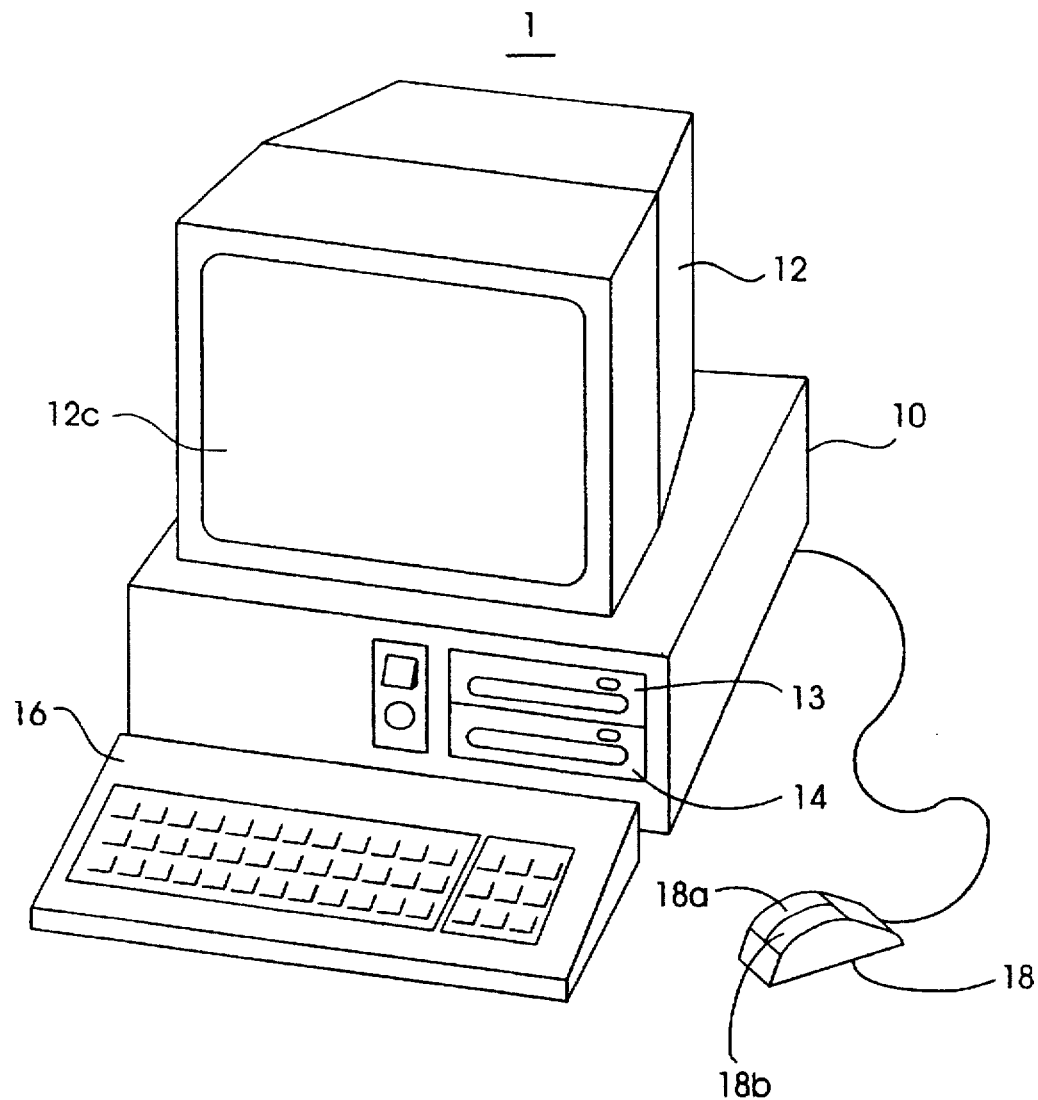
FIG. 1 illustrates a typical desktop computer system which -may be employed to practice the novel method and application of the present invention.
Figure 2:
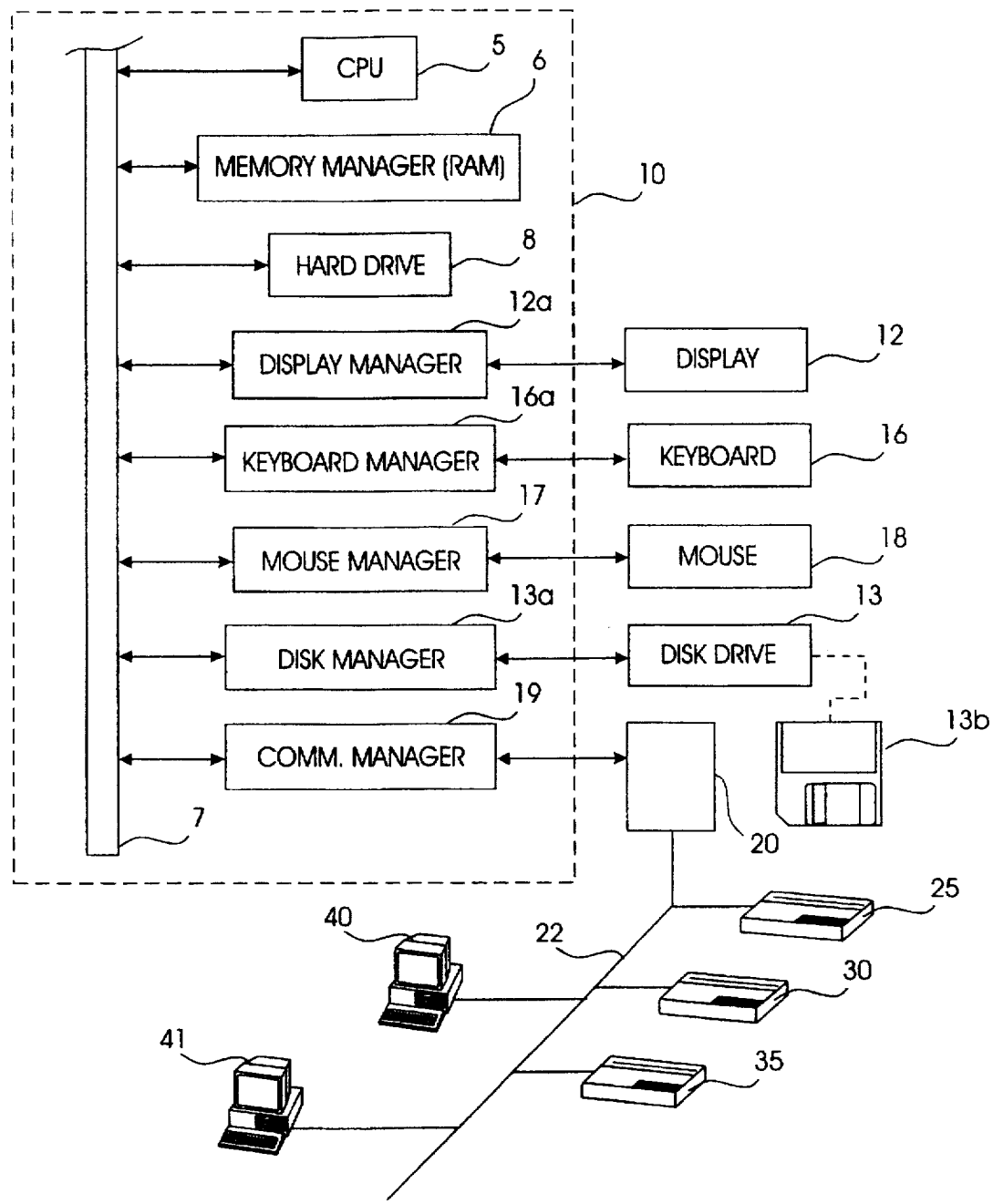
FIG. 2 is a block diagram illustrating a sample configuration of the computer system shown in FIG. 1.

Turning now to the drawings, and especially FIGS. 1 and 2, FIG. 1 diagrammatically shows a computer system 1 which may be connected to a Local Area Network system (LAN 20) as shown in FIG. 2.

As shown in FIG. 1, the computer system 1 comprises a main chassis 10, a display means or monitor 12, a connected keyboard 16 and a pointing device, in the present instance a mouse 18 which is operator controlled to move a pointer cursor 12b (shown in FIG. 3) on the display or monitor window 12c. As shown in FIG. 2, the chassis 10 includes a central processing unit, or "CPU" 5, a memory manager and associated random access memory, or "RAM" 6, a fixed disk or hard drive 8 (which may include its associated disk controller), a display manager 12a which is connected externally to the chassis 10 of the display 12; a keyboard manager 16a, which through flexible cable (not shown) is connected to the keyboard 16; a mouse manager 17 (which in some instances may form part of the display manager 12a, and may be in the form of a software driver) for reading the motion of the mouse 18 and its control mouse buttons (MB) 18a and 18b, shown in FIG. 1. A disk manager or controller 13a which controls the action of the disk drive 13 (and an optional drive such as a magneto-optical or CD ROM drive 14) shown in FIG. 1, rounds out most of the major elements of the computer system 1.

The pointer element or cursor 12b can be moved over the window 12c by movement of the mouse 18. The mouse buttons (MB) 18a and 18b give commands to the operating system, usually through a software mouse driver provided by the mouse manufacturer. With the first mouse button (MB) 18a the operator can select an object indicated on the window 12c using the pointer or cursor 12b, i.e., signify that an action subsequently to be performed is to be carried out on the data represented by the indicated element on the window 12c. The system normally gives some visual feedback to the operator to indicate the object selected, such as a change in color, or a blocking of the icon. The second mouse button (MB) 18b may be a menu button, if desired. Conventionally, when the operator presses button 18b, a selection menu or dialog with system commands will appear on the window 12c. The operator may select an icon or item from the selection menu or input information into the dialog box as appropriate using the cursor 12b and the first mouse button (MB) 18a. Some menu items, if selected, may call up another menu or submenu for the operator to continue the selection process. In this application the terms object and icon are used interchangeably.

The use of a mouse and selection menus is well known in the art, for example U.S. Pat. No. 4,464,652 to Lapson et al. describes a selection menu of the pull-down type in combination with a mouse. It should be recognized, of course, that other cursor pointing devices may be employed, for example a joystick, ball and socket, or cursor keys on the keyboard.

The foregoing devices (and software drivers therefore) within the chassis 10 communicate with one another via a bus 7. To round out the computer system 1, an operating system (not shown) must be employed. If the computer system is a typical IBM-based system, the operating system may be DOSbased and include a GUI interface such as contained in OS/2®, or WINDOWS®, or other operating system of choice. If the computer system is based upon RISC (reduced instruction set computer) architecture, then the operating system employed may be, in the instance of an IBM-based RISC architectured System/6000®, AIX. Alternatively, if the computer system 1 is a large host computer, such as a an IBM 3090, it may be running an operating system such as MVS or VM. This operating system normally includes a print service facility called PSF, which is a system-wide resource manager, which takes a "job" which has been formatted for a particular printer, and sends certain files, such as fonts, special commands and the like to the printer before sending the file to be printed.

In the illustrated instance, the computer system 1 includes an I/O (Input/Output) manager or communications manager 19 (shown in FIG. 2) which serves to link the computer system for communications with the outside world such as to a systems printer, a modem or a LAN controller (such as a Token ring or ETHERNET or even through a modem employing SDLC) such as shown at 20 in FIG. 2. The LAN controller may be incorporated inside the computer system 1 or located externally as shown diagrammatically in FIG. 2, as desired. The LAN controller 20 may connect to other computer systems 40 and 41 as well as to other printers such as printers 25, 30 and 35 by communications cable 22 and the like.

Figure 3:
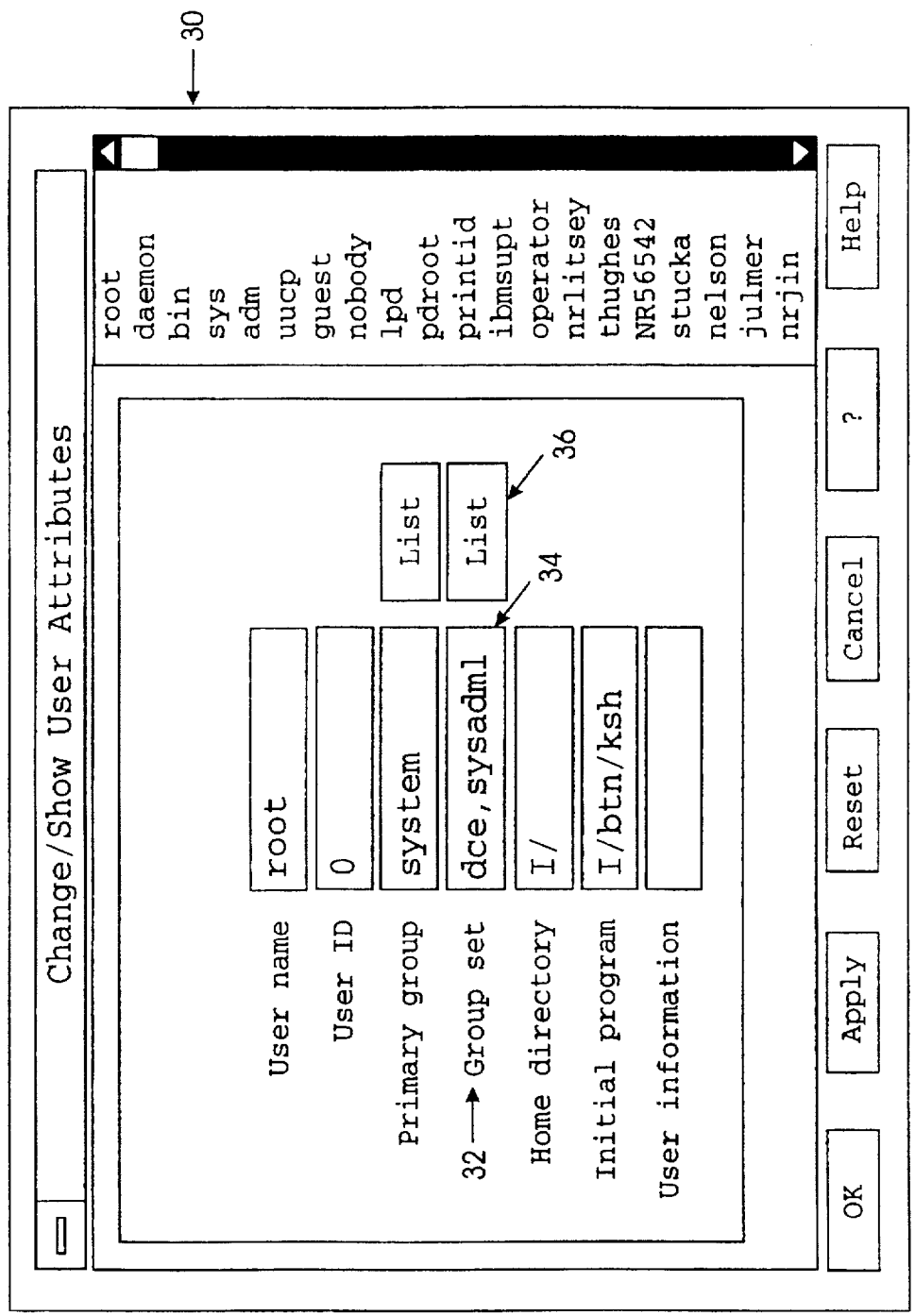
FIG. 3 is a typical window showing a subset list in a format known in the industry.

Referring now to FIG. 3, a typical window 30 is shown. This window 30 demonstrates a subset list 32 that is representative of the prior art. The subset list 32 is denominated "Group Set." Each entry in the subset list 32 is separated by a comma. Because the space allocated to the subset list 32 is small, only two entries 34 in the subset list 32 can be seen. The user cannot tell whether or not there are additional entries in the subset list.

Figure 4:
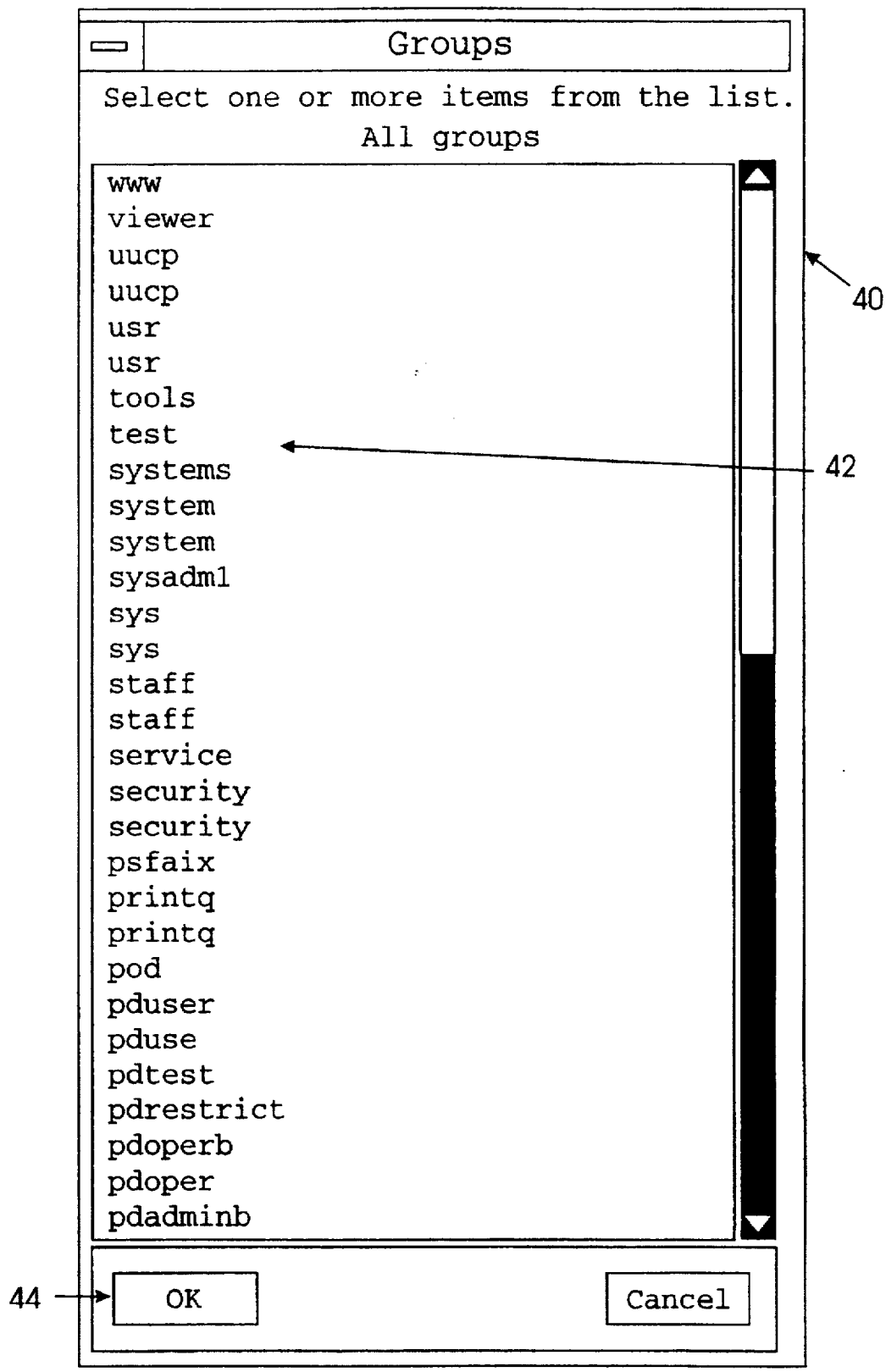
FIG. 4 is a typical window showing a superset list in a format known in the industry from which a subset list can be created.

FIG. 4 shows a typical window 40 showing the superset list 42 from which subset list 32 was selected. Window 40 appears when the "List" pushbutton 36 is selected on FIG. 3. To form the subset list 32, the user selects the desired items from superset list 42. Selection typically is done by moving the pointer element or cursor 12b to the desired entry and depressing the mouse button 18b. When all of the desired entries have been selected, the user then selects the "OK" pushbutton 44. Note that the superset list 42 contains no information as to which entries are already in the subset list 32. That at least items "dce" and "ysadm1" are in the subset list 32 is not reflected since they no longer show up as having been selected for the subset list 32.

As discussed above, a significant flaw in the prior art system is that the desired entries in the subset list 32 do not remain selected when the superset list 42 is closed and then re-opened.

Figure 5:
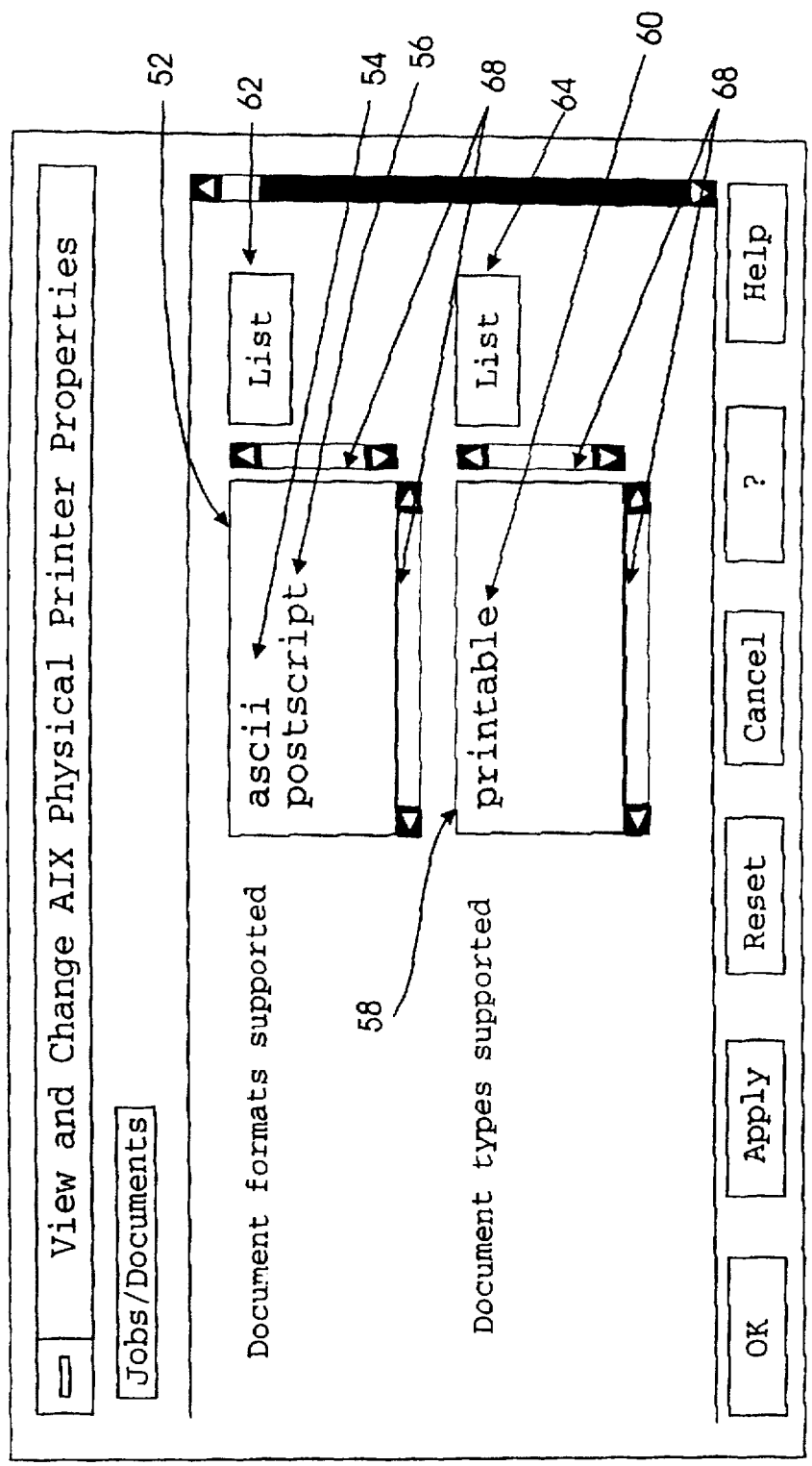
FIG. 5 is a typical window illustrating a subset list presented in the format of the present invention.

FIG. 5 shows a typical subset list 52 presented in accordance with the present invention. The two entries 54 and 56 in the subset list 52 are arranged vertically, with one entry per line. FIG. 5 also shows a second subset list 58 with one entry 60. Scroll bars 68 make it easy and convenient for the user to work with long subset lists. By selecting either "List" pushbutton, 62 or 64, the user can see the superset list from which the subset list 52 or 58, respectively, was generated.

Figure 6:
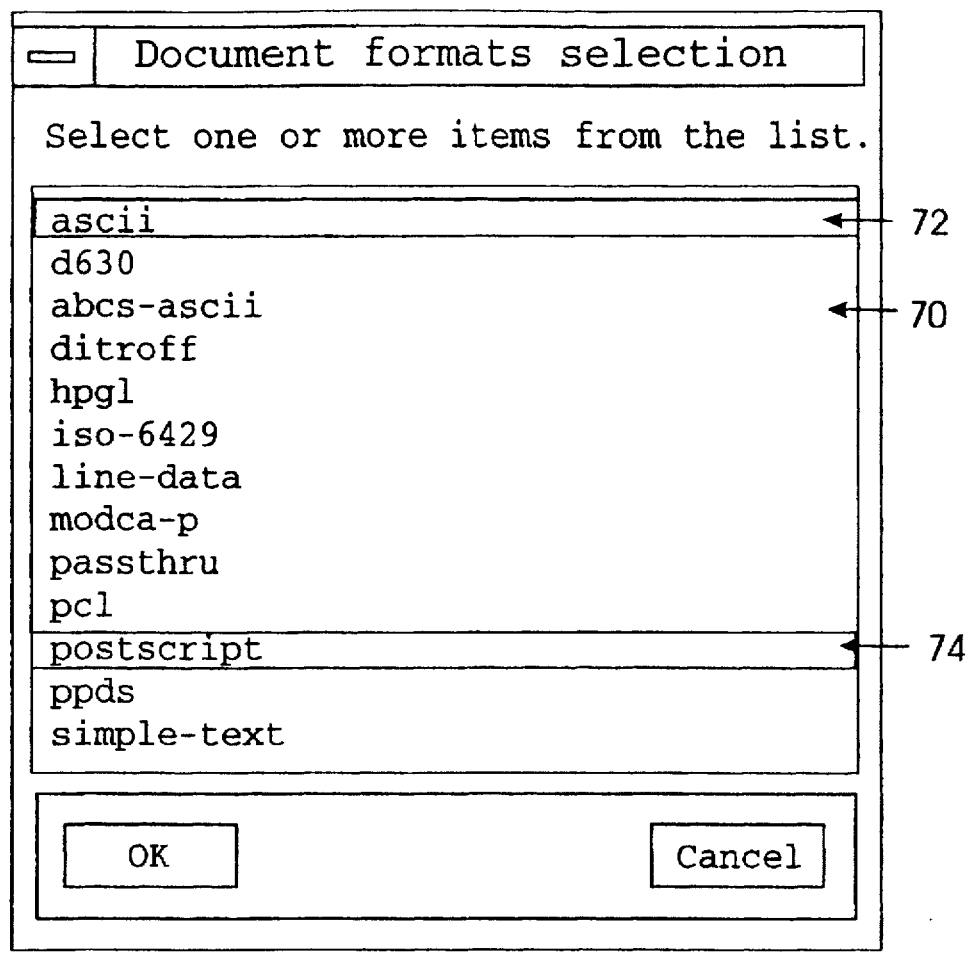
FIG. 6 is a typical window illustrating a superset list presented in the format of the present invention.

FIG. 6 shows the superset list 70 from which the subset list 52 was generated. Note that the two entries 54 and 56 in the subset list 52 remain selected in the superset list 70. In the superset list the selected entries are labelled 72 and 74.

The user thus can make changes to the subset list 52 without re-selecting all of the unchanged entries. Rather, only additions and deletions must be addressed when the user calls up the superset list 70 to make changes to the subset list 52.

Figure 7:
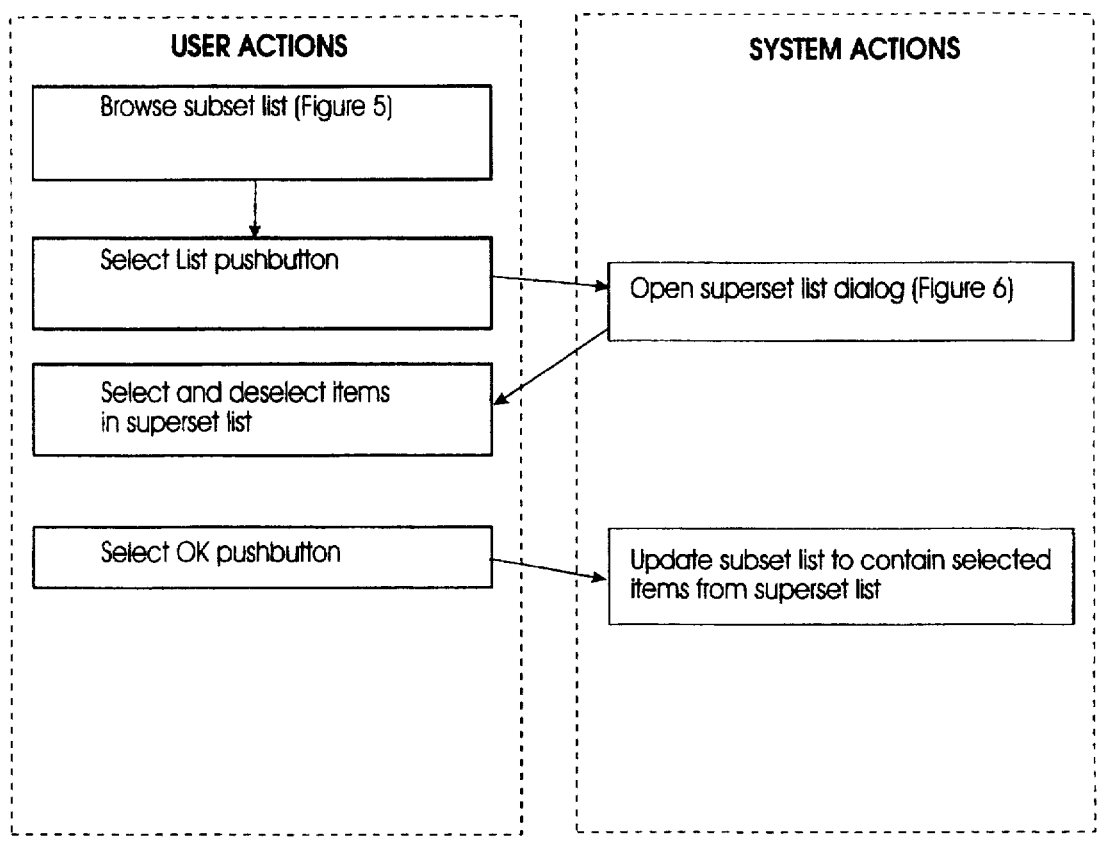
FIG. 7 is a flow chart illustrating the method of the present invention.

FIG. 7 is a flowchart showing the method of the present invention.

Although the invention has been described with a certain degree of particularity, it should be recognized that elements thereof may be altered by persons skilled in the art with out departing from the spirit and scope of the invention. The invention is limited only by the following claims and their equivalents.

What is claimed is:

1. An application for creating a subset list from a superset list as controlled by a computer system having at least a visual operator interface, an operating system for controlling the operation of program applications within the computer system, and memory for storing a program application, the application comprising:

means for selecting one or more entries on the superset list to be included on the subset list;

means for presenting the superset list in a superset list window and the subset list in a separate subset list window, wherein each subset list entry in the subset list window is entered on a separate line with the entries forming a vertical column;

means for viewing the superset list from the subset list window by selecting a pushbutton that brings up the superset list window;

means for indicating in the superset list window which entries have been selected for the subset list; and means for retaining the selection indications in the superset list window even when the superset list window is closed and then re-opened.

2. An application for creating a subset list from a superset list in accordance with claim 1 further comprising:

means for scrolling up and down in the subset list window through the entries selected for the subset list.

3. An application for creating a subset list from a superset list, in accordance with claim 1, wherein the means for indicating further comprises enclosing in a box each entry that has been selected for the subset list.

4. An application for creating a subset list from a superset list, in accordance with claim 1, further comprising:

means for scrolling left and right in the subset list window through the entries selected for the subset list.

5. An application for creating a subset list from a superset list as controlled by a computer system having at least a visual operator interface, an operating system for controlling the operation of program applications within the computer system, and memory for storing a program application, the application comprising;

means for selecting one or more entries on the superset list to be included on the subset list;

means for presenting the superset list in a superset list window and the subset list in a separate subset list window, wherein each subset list entry in the subset list window is entered on a separate line with the entries forming a vertical column;

means for viewing the superset list from the subset list window by selecting a pushbutton that brings up the superset list window;

means for indicating in the superset list window which entries have been selected for the subset list;

means for retaining the selection indications in the superset list window even when the superset list window is closed and then re-opened; and means for scrolling up and down in the subset list window through the entries selected for the subset list.

6. An application for creating a subset list from a superset list, in accordance with claim 5, wherein the means for indicating further comprises enclosing in a box each entry that has been selected for the subset list.

7. An application for creating a subset list from a superset list, in accordance with claim 5, further comprising:

means for scrolling left and right in the subset list window through the entries selected for the subset list.

8. A method for creating a subset list from a superset list as controlled by a computer system having at least a visual operator interface, an operating system for controlling the operation of applications within the computer system, and memory for storing at least part of an application therein, the method comprising the steps of;

selecting one or more entries on the superset list to be included on the subset list;

presenting the superset list in a superset list window and the subset list in a separate subset list window, wherein each subset list entry in the subset list window is entered on a separate line with the entries forming a vertical column;

viewing the superset list from the subset list window by selecting a pushbutton that brings up the superset list window;

indicating in the superset list window which entries have been selected for the subset list; and retaining the selection indications in the superset list window even when the superset list window is closed and then re-opened.

9. A method for creating a subset list from a superset list in accordance with claim 8 further comprising:

scrolling up or down as desired in the subset list window through the entries selected for the subset list.

10. A method for creating a subset list from a superset list, in accordance with claim 8, wherein the step of indicating in the superset list window which entries have been selected for the subset list further comprises enclosing in a box each entry that has been selected for the subset list.

11. A method for creating a subset list from a superset list, in accordance with claim 8, further comprising:

scrolling left or right as desired in the subset list window through the entries selected for the subset list.

12. A method for creating a subset list from a superset list as controlled by a computer system having at least a visual operator interface, an operating system for controlling the operation of applications within the computer system, and memory means for storing an application therein, the method comprising the steps of:

selecting one or more entries on the superset list to be included on the subset list;

presenting the superset list in a superset list window and the subset list in a separate subset list window, wherein each subset list entry in the subset list window is entered on a separate line with the entries forming a vertical column;

viewing the superset list from the subset list window by selecting a pushbutton icon that brings up the superset list window;

indicating in the superset list window which entries have been selected for the subset list;

retaining the selection indications even when the superset list window is closed and then re-opened; and scrolling up and down as desired in the subset list window through the entries selected for the subset list.

13. A method for creating a subset list from a superset list, in accordance with claim 12, wherein the step of indicating in the superset list window which entries have been selected for the subset list further comprises enclosing in a box each entry that has been selected for the subset list.

14. A method for creating a subset list from a superset list, in accordance with claim 12, further comprising:

scrolling left or right as desired in the subset list window through the entries selected for the subset list.

* * * * *